United States Patent [19]
Bennett et al.

[11] Patent Number: 5,421,751
[45] Date of Patent: Jun. 6, 1995

[54] TAPPABLE BUS BAR

[75] Inventors: Glenn E. Bennett, Glendale; John K. Daly, Scottsdale; John E. Lucius, Glendale, all of Ariz.

[73] Assignee: The Whitaker Corporation, Wilmington, Del.

[21] Appl. No.: 97,527

[22] Filed: Jul. 27, 1993

[51] Int. Cl.6 ............................................ H01R 13/187
[52] U.S. Cl. ................................... 439/843; 439/786
[58] Field of Search ................... 439/210–212, 439/787, 791, 842–847, 851–856, 861, 92, 108, 786

[56] References Cited
U.S. PATENT DOCUMENTS

| | | | |
|---|---|---|---|
| 3,453,587 | 7/1969 | Neidecker. | |
| 3,845,451 | 10/1974 | Neidecker | 439/787 |
| 4,013,329 | 3/1977 | Hugin | 339/9 E |
| 4,120,557 | 10/1978 | Horrocks | 439/843 |
| 4,735,577 | 4/1988 | Munroe et al. | 439/212 |
| 4,995,814 | 2/1991 | Weidler | 439/856 |
| 5,261,840 | 11/1993 | Benz | 439/843 |

*Primary Examiner*—David L. Pirlot
*Attorney, Agent, or Firm*—Robert J. Kapalka

[57] ABSTRACT

A tappable conductive bus bar (11, 11') has a longitudinal slotted recess (17, 19) receiving at least one louvered spring strip (22, 23). At least one tab (26) is received through a gap (21) in the bus bar (11) to engage the louvered spring strip (22, 23). The bus bar (11) supplies current, with minimum wiring and parts, to one or more tabs (26), and the spacing between adjacent tabs (26) is not critical. Thus, the bus bar (11) is completely tappable.

1 Claim, 6 Drawing Sheets

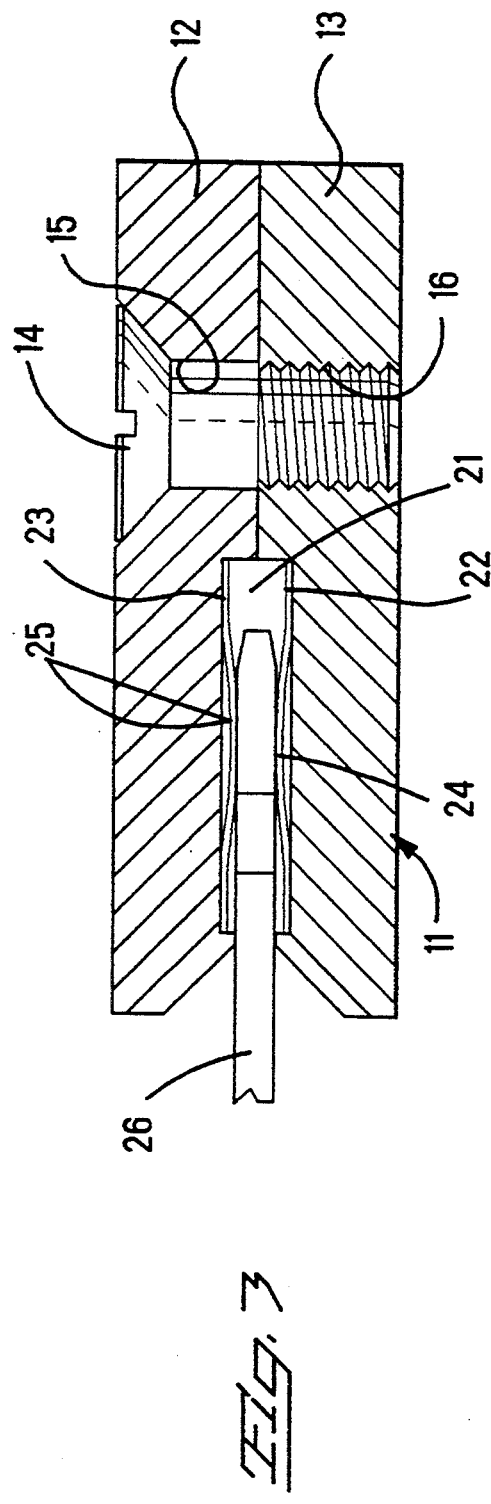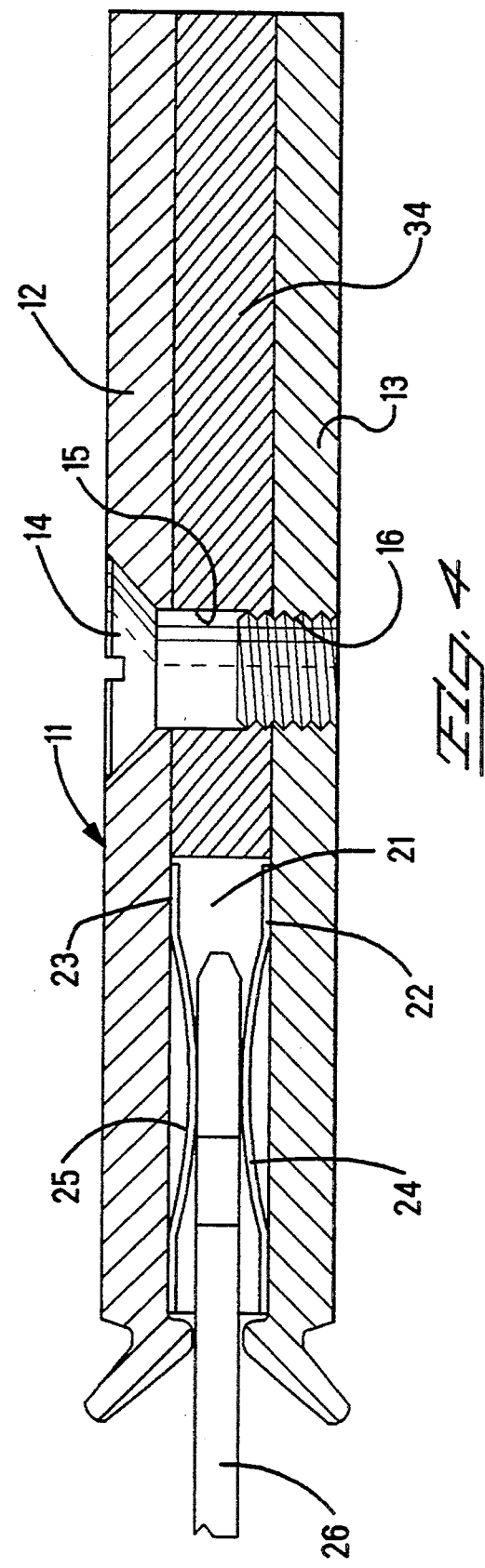

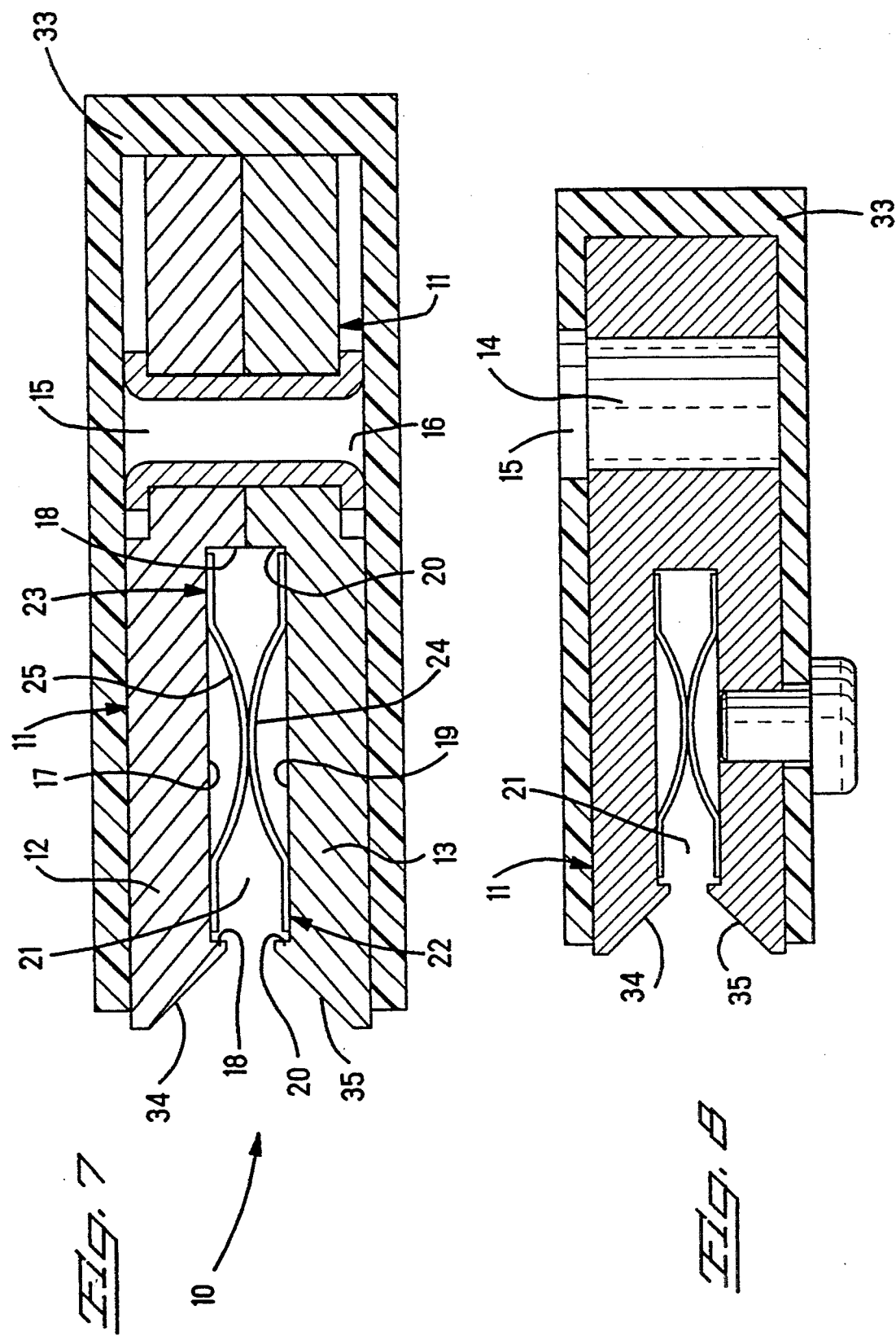

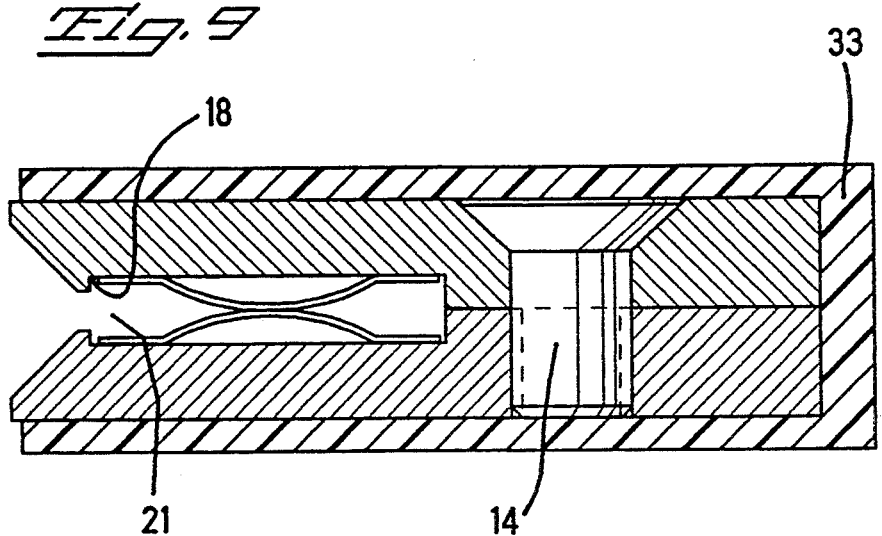
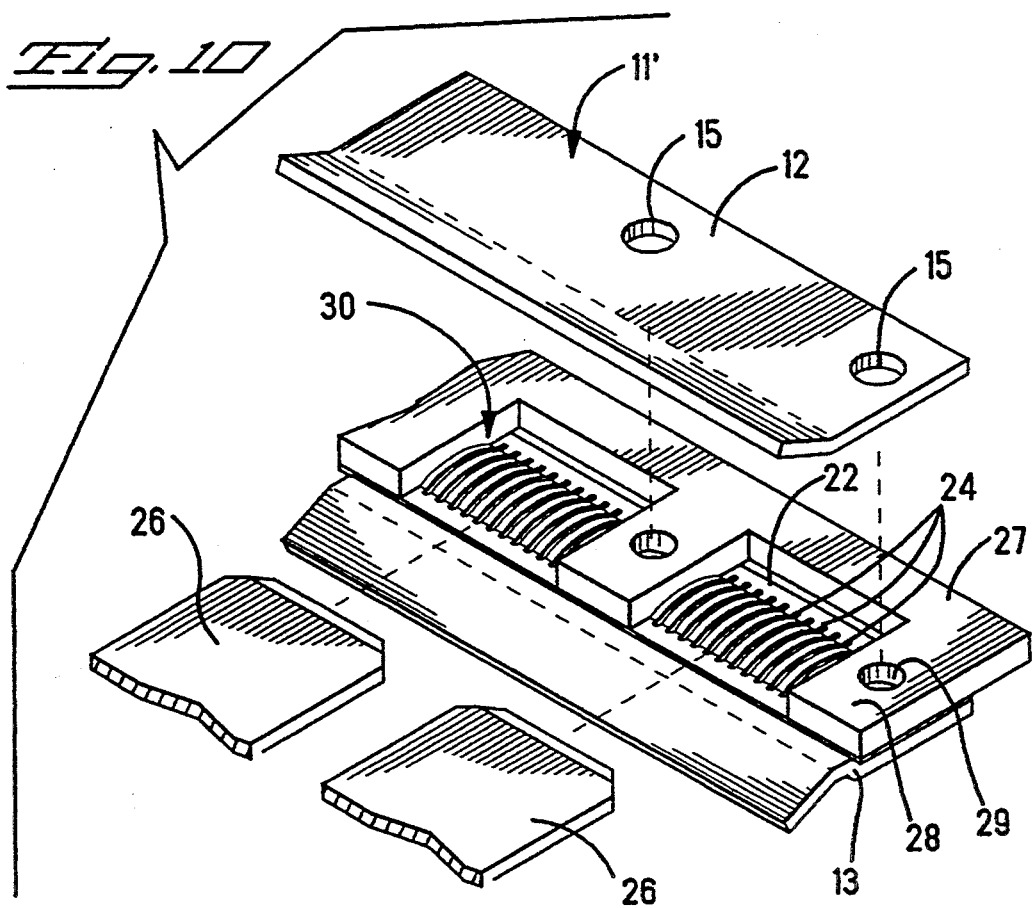

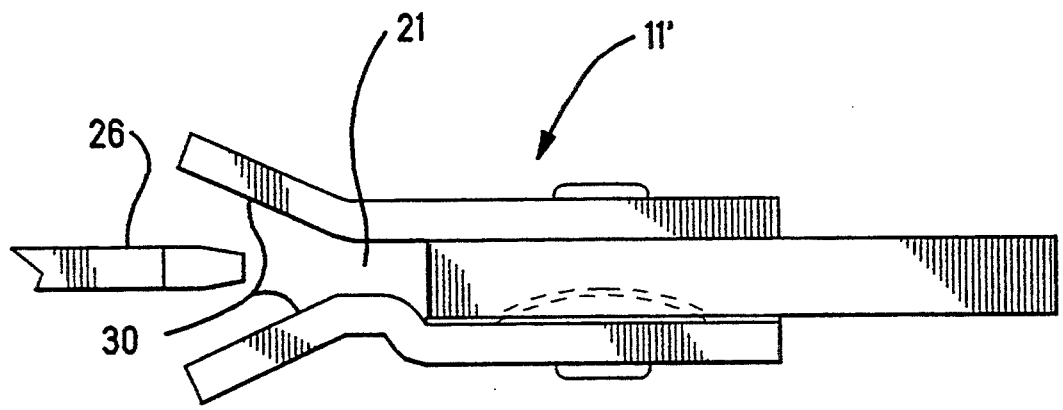
_Fig. 11_
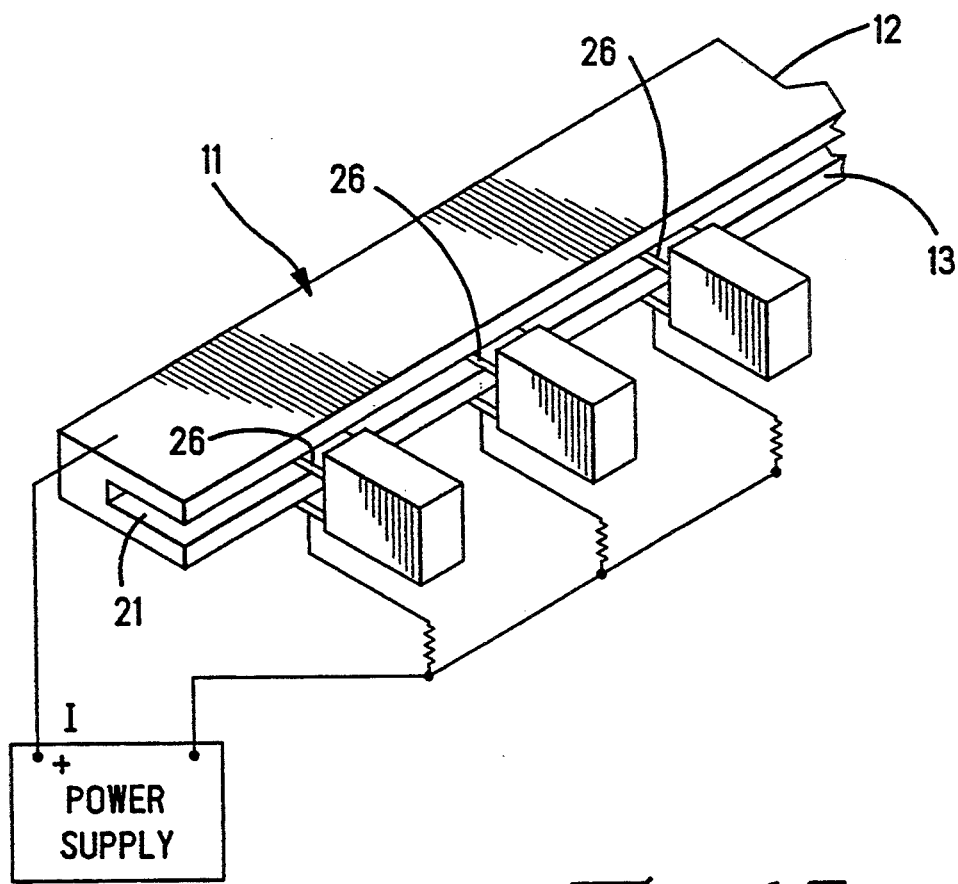
_Fig. 12_

TAPPABLE BUS BAR

FIELD OF THE INVENTION

The present invention relates to an electrical connector and, more particularly, to an electrical connector for supplying current to tabbed fuse devices.

BACKGROUND OF THE INVENTION

In electrical apparatus and products, a plurality of fuses are used to protect various electrical loads. One such application is telephone switching systems. There, a source of current is supplied to the plurality of fuses and their respective loads via a bus bar. The bus bar is a longitudinal strip or bar of conductive material having a plurality of spaced-apart tapped holes to receive respective screws. Each screw clamps a "spade" head terminal to the bus bar, the "spade" head terminal being received between the bus bar and a washer carried by the screw. The "spade" head terminal, in turn, is crimped to one end of a jumper wire. The other end of the jumper wire is crimped to a tab on the fuse (such as a "FASTON" tab connector available from AMP Incorporated of Harrisburg, Pa., U.S.A.).

Thus, each fuse has its own jumper and "spade" head terminal, and the system requires extensive wiring and precise connections between tabs and jumpers. The location on the longitudinal bus bar from which a tabbed fuse device is supplied current thereto is called a "tap," and the distance between taps is called the "pitch" or "tap pitch".

Problems occur in the known switching systems because each individual tab must be connected to an individual jumper and, in turn, to a particular location on the bus bar. Such a limitation is time consuming, labor intensive, inefficient, complicates assembly and repair, and increases manufacturing costs. Additionally, the numerous interfaces reduce reliability, and the extensive wiring causes resistance and heating. Further disadvantages of a structural nature are found in the known connectors, including requiring excessive space, and sacrificing economy of construction to achieve structural integrity.

On the other hand, and for completely different purposes, louvered spring devices have been used. For example, U.S. Pat. No. 3,453,587 (issued to Neidecker on Jul. 1, 1969) discloses use of a louvered spring bent into a substantially circular form and used for lining the interior of a confined plug space into which an exactly matable plug is inserted. Further, U.S. Pat. No. 3,845,451 (issued to Neidecker on Oct. 29, 1974) discloses exactly matable jack and plug units plugged together; the interior of the jack has a metal plate cut with a plurality of tongues which are twisted out of the plane of the metal plate so that they extend into the interior of the jack and bear on the respective jack inserted into the plug. Also, U.S. Pat. No. 4,013,329 (issued to Hugin on Mar. 22, 1977) discloses stacks of plates having spring-loaded fins to improve the quality of the electrical connection between opposing solid plates and to eliminate the need for high-pressure contact between opposing plates in heavy-duty connector equipment.

Louvered strips are commercially available, such as "Louvertac" strips available from AMP Incorporated of Harrisburg, Pa., U.S.A. The strips may be cut into various lengths and, since the product applications are circular or concentric, the strips are bent into circular forms.

Nevertheless, for many years a need has existed for a simple, efficient low-cost means for connecting fuses to a bus bar in a switching system.

This means should provide assured electrical connections along the length of the bus bar sufficient to transmit substantial levels of current.

SUMMARY OF THE INVENTION

Accordingly, it is an object of the present invention to provide a connection system for supplying current to a row of tabbed fuse devices, such that the connection system supplies current directly to those fuse devices, contains a minimal number of parts, is easy to assemble, contains few interfaces, and handles any tap pitch between tabbed fuse devices, thereby providing a system that better dissipates heat, increases product reliability, minimizes labor, and minimizes production costs.

It is a further object of the present invention to provide an electrical connection system which may be used to supply current to variously-configured tabbed fuse device arrays, and thus functions as a "universal" bus bar which is versatile.

It is a further object of the present invention to provide a structurally improved bus bar, which is cost-effective to manufacture.

The present invention is applied to a switching system, wherein a conductive bus bar supplies current to at least one fuse device and its respective load, wherein the fuse device has at least one tab connected to one end of a jumper wire, the other end of the jumper wire being connected to a terminal, and wherein the terminal is normally connected at a fixed location on the bus bar. The improvement of the present invention includes at least one louvered strip carried by the bus bar. The louvered strip has a given length and is transversely slotted along its length to form a plurality of closely-spaced spring elements thereon. With this arrangement, the tab may be inserted directly into the conductive bus bar at any location along the length thereof to physically contact at least one of the spring elements on the louvered strip, thereby exerting a resilient bias on the tab to maintain engagement with the bus bar for supplying current to the tab, and thereby eliminating a jumper wire and its terminal.

The conductive bus bar and the louvered strip may be of sufficient length to allow insertion of a plurality of tabs into the conductive bus bar. The tabs are insertable into the conductive bus bar regardless of the pitch or distance between tabs.

In one embodiment, the tappable bus bar has an upper metal plate secured to a lower metal plate. At least one of the plates has a longitudinal slotted recess formed therein. The longitudinal slotted recess has a pair of spaced-apart shoulders transversely therein. A conductive louvered spring strip is housed in the longitudinal slotted recess and is retained between the shoulders therein.

These and other objects of the present invention will become apparent from a reading of the following specification taken in conjunction with the enclosed drawings.

BRIEF DESCRIPTION OF THE DRAWINGS

FIG. 3 is a sectional view, showing the components of FIG. 2 in their assembled relationship, and showing the gap into which a "FASTON" tab is inserted.

FIG. 4 is a sectional view of an alternate embodiment, showing the components of a stamped and formed version, wherein a "FASTON" tab is inserted into the gap within the bus bar, and wherein an intermediate plate is disposed between the upper and lower plates, respectively.

FIG. 7 is a cross-sectional view of an alternative embodiment similar to that of FIG. 2, showing a pair of louvered spring strips, and further showing the bus bar halves fastened with eyelets and having the assembled bus bar surrounded by insulation.

FIG. 8 is a cross-sectional view of an alternate embodiment, wherein the bus bar comprises a single piece and is surrounded by insulation.

FIG. 9 is a cross-sectional view corresponding substantially to FIG. 3, but showing the bus bar surrounded by insulation.

FIG. 10 is an exploded perspective view of an alternative embodiment, showing a two-piece bus bar, a single louvered spring strip on the lower bar, a spacing plate, and a corresponding mating blade.

FIG. 11 is a side elevational view of the FIG. 10 embodiment, showing the relationship of the components to the spacer plate.

FIG. 12 is a perspective view of an assembled one-piece tappable bus bar, showing the orientation of the power supply to the tappable bus bar, and further showing the insertion of a row of tabbed fuse devices directly into the tappable bus bar.

DETAILED DESCRIPTION OF THE PREFERRED EMBODIMENTS

Figure 1:
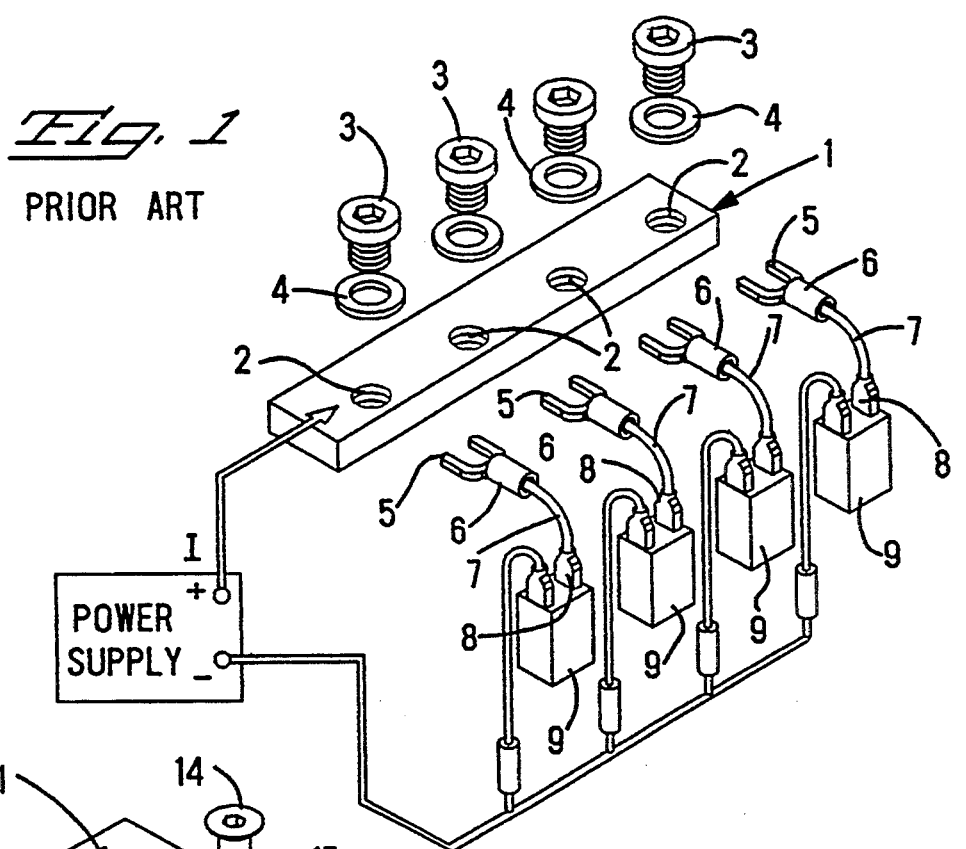
FIG. 1 is a perspective view of a prior art assembled bus bar, wherein each fuse is equipped with its own "FASTON" tab crimped to its respective jumper wire, the other end of the jumper wire having a "spade" head terminal crimped thereon, and wherein the "spade" head terminal must be mated to a particular fixed tap on the bus bar.

With reference to FIG. 1, a prior art bus bar 1 has a plurality of tapped holes 2. A screw 3 and washer 4 are received in each hole 2, thereby providing a plurality of fixed taps on the bus bar. A corresponding plurality of "spade" head terminals 5 must be mated with each fixed tap. Each "spade" head terminal 5 has a crimped connection 6 to its respective jumper wire 7. Each jumper wire 7 is connected to its respective "FASTON" tab 8. Each tab 8 is connected to a fuse or load 9. This arrangement, with its numerous wires and connections gives rise to problems in the manufacturing and servicing of switching systems.

Figure 2:
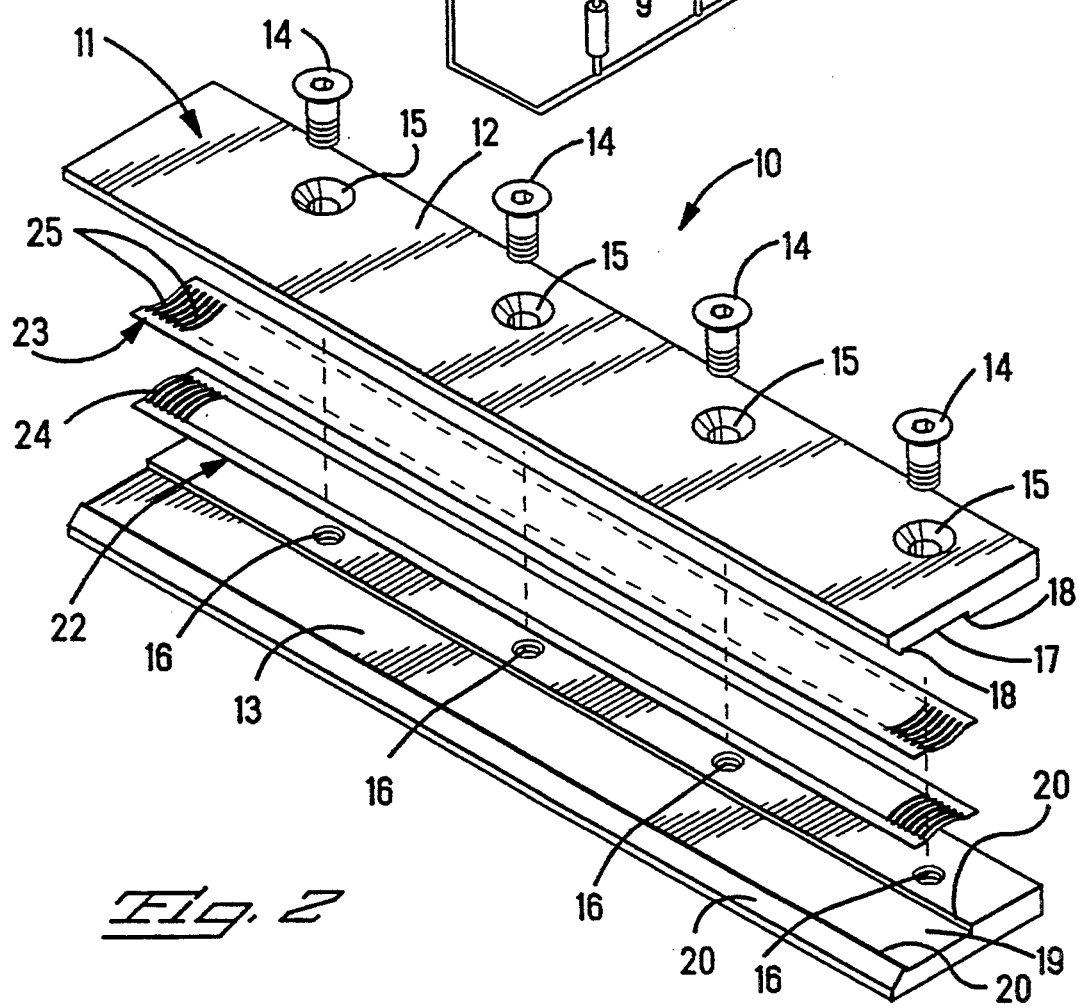
FIG. 2 is an exploded perspective of a first embodiment of the present invention, wherein two metal louvered spring strips are disposed between a pair of metal plates forming the bus bar.

Contrasted thereto, with reference to FIGS. 2 and 3, a first embodiment 10 of the present invention includes a conductive bus bar 11. The bus bar 11 includes an upper plate 12 and a lower plate 13 secured together by a plurality of screws 14. The screws 14 pass through respective openings 15 in the upper plate 12 and are received in respective tapped recesses 16 in the lower plate 13. Upper plate 12 has a longitudinal slotted recess 17 and further has a pair of spaced-apart shoulders 18 formed transversely therein. Lower plate 13, in turn, has a longitudinal slotted recess 19 and further has a pair of shoulders 20 formed transversely therein. These longitudinal slotted recesses 17 and 19 on the upper plate 12 and lower plate 13, respectively, communicate therebetween to form a gap 21 in the bus bar 11.

A pair of louvered spring strips 22 and 23, respectively, are mounted in the gap 21 between the upper plate 12 and the lower plate 13. The strips 22 and 23, which have a central crowned portion, are retained in the respective longitudinal slotted recesses 19 and 17 by the respective pairs of shoulders 18 and 20. Each louvered spring strip 22 and 23 is transversely slotted along its length to provide a plurality of closely-spaced louvered springs (or spring elements) 24 and 25. For simplicity, all the spring members of springs 24 and 25 along the length of spring strips 22 and 23 are not shown on FIG. 2.

With reference to FIG. 4 (wherein like numbers have been used to identify parts identical to, or substantially similar to, the components of FIGS. 2 and 3) the gap 21 is created between the upper plate 12 and the lower plate 13 by means of an intermediate conductive spacer plate 34 secured between the upper plate 12 and the lower plate 13 by the screws 14. In this alternate embodiment, all of the plates 12, 13 and 34, respectively, may be formed by a convenient stamping operation, if desired. Moreover, as shown in FIG. 4, a "FASTON" tab 26 is inserted into the gap 21 in bus bar 11 and is received between the louvered spring strips 22 and 23.

Figure 5:
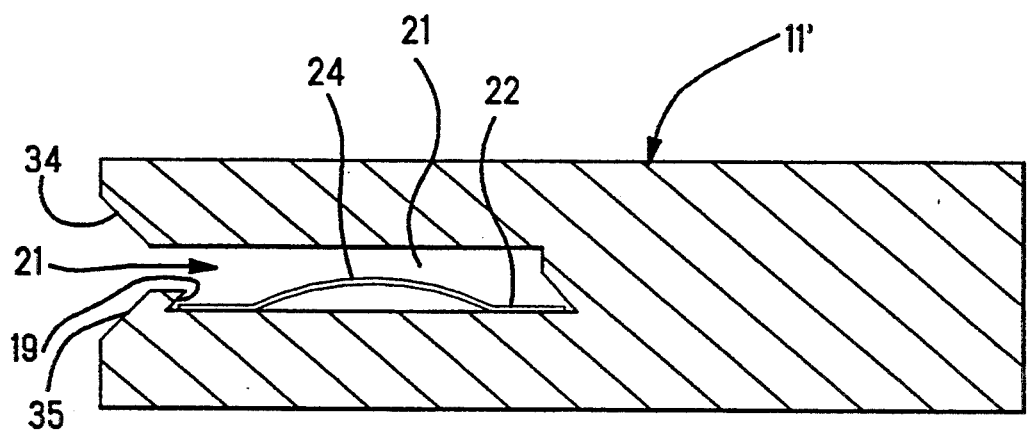
FIG. 5 is a sectional view of another embodiment, showing a one-piece bus bar with a single louvered strip.
Figure 6:
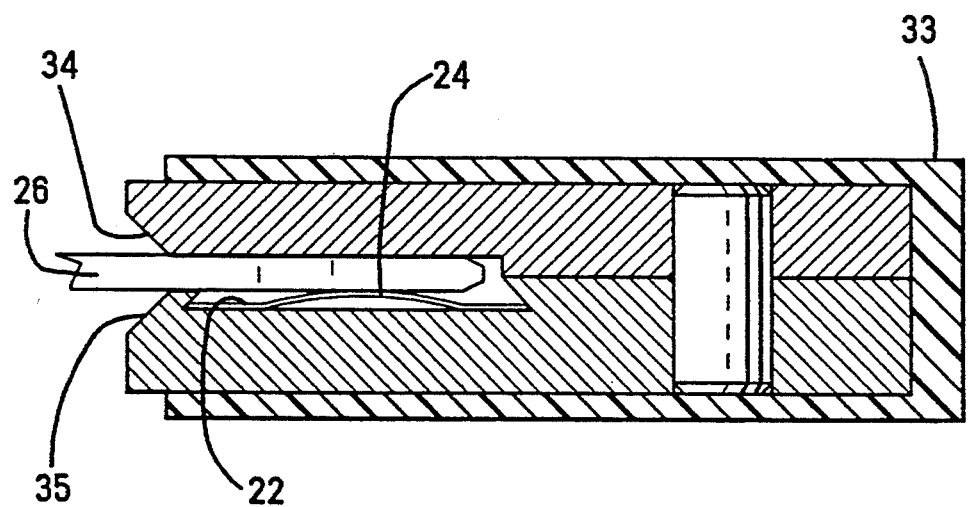
FIG. 6 is a sectional view of an alternate embodiment, showing a two-piece bus bar, and showing the entry of a "FASTON" tab into the gap therein to make contact with a single louvered strip.

With reference to FIG. 5, a further embodiment of the present invention is illustrated, wherein the combination bus bar 11' comprises a single piece with a slot (or gap 21) formed therein by machining, extrusion, or other suitable means. Moreover, a single louvered spring strip 22 is shown.

As shown in FIGS. 4, 6, 7 and 12, a tab 26 is inserted into the gap 21. The tab 26 comes in contact with at least one of the individual louvered spring strips 22, 23. A single louvered strip 22 may be used (as in FIG. 5) or a pair of louvered strips 22 and 23 (as in FIG. 2). The louvered spring strips 22, 23 thus exert a resilient bias against the tab 26 in the gap 21 in the bus bar 11, to ensure good electrical contact.

The louvered spring strips 22 and 23 and the corresponding plates 12 and 13 are of sufficient length to allow insertion of a plurality of tabs 26. The tabs 26 are plugged into the tappable bus bar 11 so long as the thickness of the tabs 26 approximately corresponds to the thickness of the gap 21 into which they are inserted. Additionally, the tabs 26 need not be arranged with any particular pitch (that is, spacing) between the tabs 26. This feature of the invention sharply contrasts with the earlier bus bar of FIG. 1.

As shown in FIGS. 6, 7, 8 and 9, insulation material 33 may surround the conductive bus bar 11. Also, the metal plates 12 and 13 have chamfered longitudinal edges 34 and 35, respectively, to facilitate insertion of the tab 26 into the gap 21.

With reference to FIGS. 10 and 11 (wherein like numbers have been used to identify parts identical to, or substantially similar to, the components of FIGS. 2–9) a tappable bus bar 11' having a solid spacer plate 27 is shown. The spacer plate 27 has at least one spacer plate leg 28 which constitutes the widest part of the spacer plate 27. The spacer plate 27 is sandwiched between the plates 12 and 13, which are fastened together by a plurality of rivets or other suitable fasteners 14. At least one louvered strip 22 is disposed between the lower plate 13 and the spacer plate 27. Between the spacer plate legs 28 is at least one gap 30 formed between the plates 12 and 13. The gap 30 receives one or more mating tabs or blades 26. Each mating tab or blade 26 comes into contact with at least one louvered spring 24. In the tappable bus bar of FIGS. 10 and 11, the louvered strip 22 passes under the spacer plate legs 28 and is flattened.

Thus, it will be appreciated by those skilled in the art that the tappable bus bar of the present invention has a versatile docking ability, provides an elegant solution to the problems of reducing the wiring and elements needed to supply current to a row of tabbed fuse devices, reduces the need for tooling changes to accommodate different tap pitches of fuse device arrays, reduces resistance and heating in supplying current to such a system, and reduces labor and hence production costs. These advantages particularly may be seen by comparing the known bus bar of FIG. 1 to the tappable bus bar of the present invention shown in FIG. 12. It further will be appreciated by those skilled in the art that the spacer plate 27 of the present invention further reduces manufacturing costs of electrical connectors, particularly associated with small linear spring versions, as well as providing structural and space-saving advantages.

A primary benefit in applying the teaching of the present invention to telephone switching systems was the elimination of individual wires running to each individual fuse and the considerable labor required to install these wires. This was possible because the fuses could plug directly into the improved bus bar of the present invention. Furthermore, each of the improved bus bars 10 was designed to service multiple fuses 9, with the overall system employing a plurality of such bus bars 10. It is believed that a secondary benefit of the present invention will be an improvement in reliability due to the elimination of all of the electrical connections involved in each jumper wire 7. A significant advantage of the present invention is that the bus bar does not require any fixed "tap pitch". Thus, a particular bus bar configuration can service many applications and can accommodate systems having different tap pitches.

Obviously, many modifications may be made without departing from the basic spirit of the present invention. For example, the tappable bus bar system need not be contained between two plates, but may be used in any structural configuration. By way of further examples, the structural advantages of the spacing plate system may appear in other contexts than shown, such as in "fork contact" jacks, and may use other numbers and arrangements of louvered strips. Accordingly, it will be appreciated by those skilled in the art that within the scope of the appended claims, the invention may be practiced other than has been specifically described herein.

What is claimed is:

1. A conductive bus bar for use in a switching system having at least one electrical device with a terminal blade electrically coupled thereto, the bus bar comprising:

an upper metal plate and a lower metal plate, at least one of the plates having a longitudinal recess defined between a pair of transversely spaced apart shoulders;

a louvered spring strip disposed in the recess, the louvered spring strip being transversely slotted along a length thereof to define a plurality of closely spaced spring elements;

a spacer plate sandwiched between the upper metal plate and the lower metal plate, the spacer plate having a plurality of transversely-projecting spacer plate legs in compressive abutment with the spring strip, the plurality of legs defining openings between adjacent ones thereof such that the openings extend in a longitudinal array along the spring strip for access to exposed ones of the spring elements, each of the openings being dimensioned to receive the terminal blade therein; and, means for securing the upper metal plate, the lower metal plate and the spacer plate together;

wherein the terminal blade is insertable in any one of the openings for electrical engagement with the spring strip.

* * * * *